United States Patent [19]

Will

[11] Patent Number: 5,012,954
[45] Date of Patent: May 7, 1991

[54] TIRE INFLATION SYSTEM

[76] Inventor: Conrad A. Will, 4130 La Jolla Village Dr., #201, La Jolla, Calif. 92037

[21] Appl. No.: 476,876

[22] Filed: Feb. 8, 1990

[51] Int. Cl.⁵ .............................................. B60C 23/10
[52] U.S. Cl. ......................................... 222/5; 141/38; 141/330; 152/415; 222/91
[58] Field of Search ........................ 222/3, 5, 91, 399; 141/19, 38, 330; 152/415, 416; 137/223, 224, 231, 229; 251/903; 279/1 Q; 73/756

[56] References Cited

U.S. PATENT DOCUMENTS

| | | | |
|---|---|---|---|
| 805,474 | 11/1905 | Lavertine et al. | 222/5 |
| 927,798 | 7/1909 | Hoff | 222/5 |
| 2,575,908 | 11/1951 | Clifford | 152/415 |
| 2,596,415 | 5/1952 | Kochner | 222/5 X |
| 2,786,333 | 3/1957 | Makara | 222/5 X |
| 2,991,629 | 7/1961 | Rose | 141/38 X |
| 3,448,779 | 6/1969 | Horwitt | 141/38 |
| 4,281,775 | 8/1981 | Turner | 222/91 X |
| 4,489,855 | 12/1984 | Boetger | 222/5 |
| 4,773,454 | 9/1988 | Kroh et al. | 141/330 |

FOREIGN PATENT DOCUMENTS

| | | | |
|---|---|---|---|
| 3205264 | 8/1983 | Fed. Rep. of Germany | 141/38 |
| 13574 | 3/1911 | France | 141/38 |
| 0136718 | 11/1978 | Japan | 141/38 |
| 0204398 | 12/1982 | Japan | 222/3 |
| 24188 | of 1896 | United Kingdom | 222/3 |
| 1439709 | 6/1976 | United Kingdom | 222/5 |

*Primary Examiner*—Kevin P. Shaver
*Attorney, Agent, or Firm*—Brown, Martin, Haller & McClain

[57] ABSTRACT

The invention relates to a system for inflating tire tubes, more specifically the inflation of bicycle tire tubes either a SCHRADER or PRESTA type inflation valve. In one embodiment, a conduit having an internal gas passage threadably connects the tire tube inflation valve to a sealed cartridge containing a requisite volume of pressurized gas to inflate a mounted tire. A pointed puncture tube mounted at the inlet end of the conduit and forming a portion of the internal passage, ruptures the cartridge seal when the cartridge is connected to the conduit. The gas flow through this ruptured seal is controllable by a seal around the puncture tube that contacts the cartridge seal. Attachment means and seal elements contained within the conduit prevent loss of the pressurized gas during tube inflation. A gas-tight connection to the tube inflation valve is created by a resilient coupling member mounted at the outlet end of the conduit. The resilient coupling member is selectively adaptable for use with either a SCHRADER or PRESTA tube inflation valve.

8 Claims, 2 Drawing Sheets

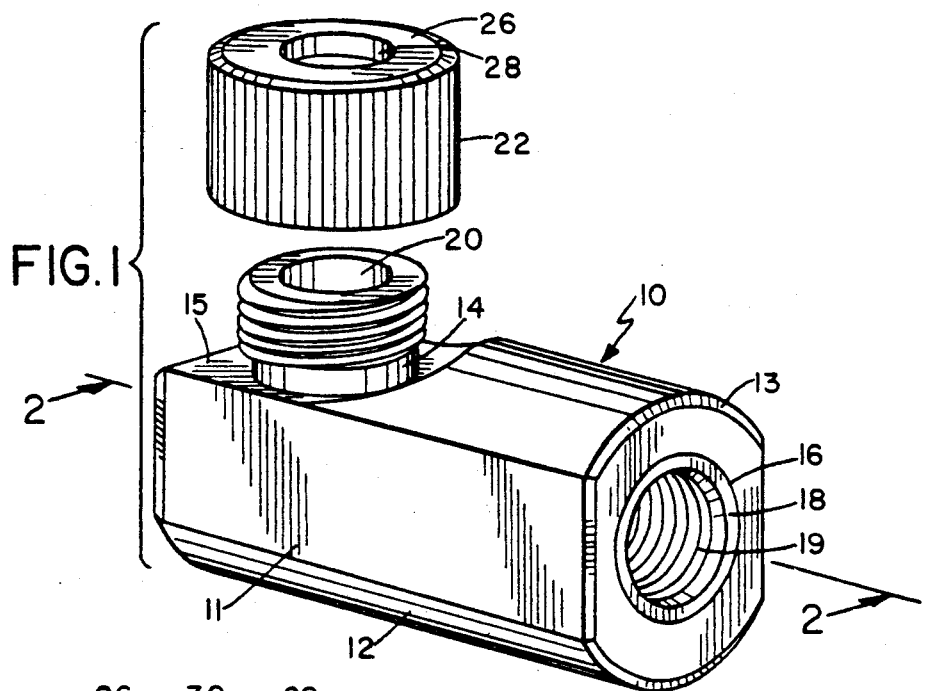
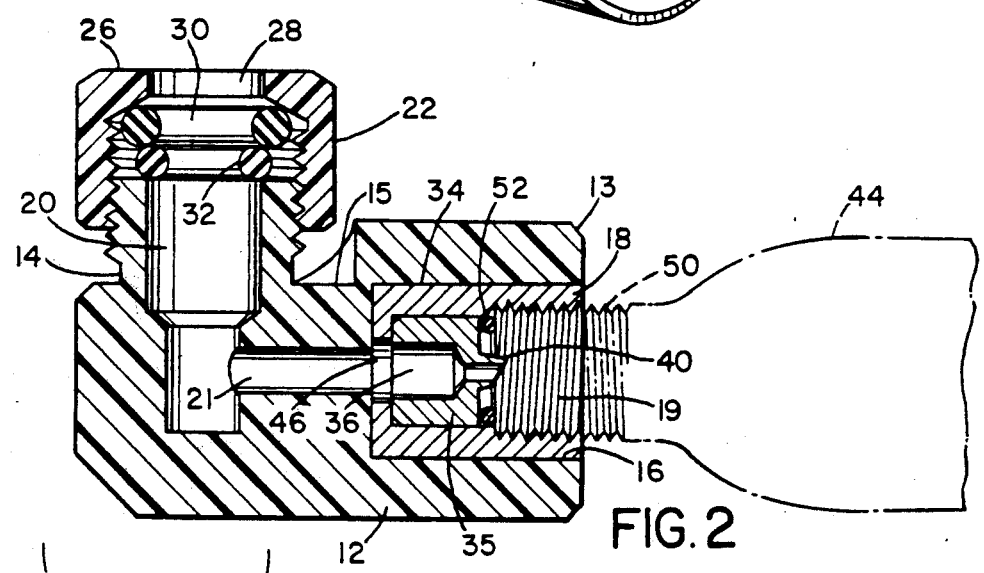
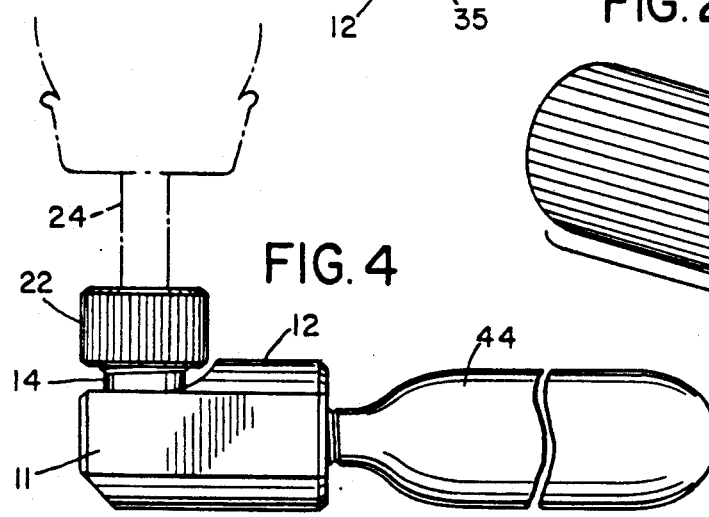
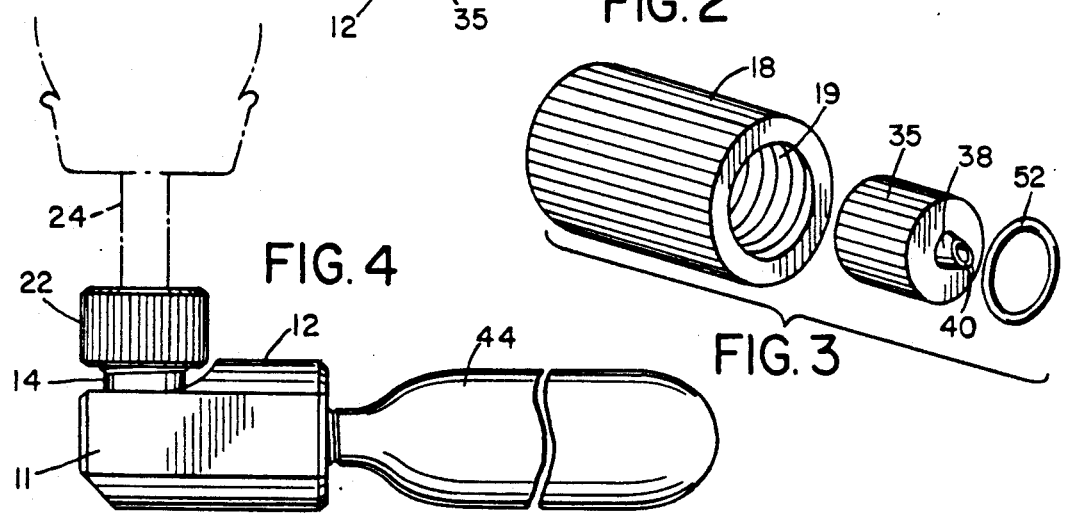

TIRE INFLATION SYSTEM

BACKGROUND OF THE INVENTION

The sport of bicycling enjoys widespread enthusiastic popularity throughout the world. The advent of the lightweight thin-tired bicycle greatly fosters the sport and encourages extended bicycle travel by both individual and group participants in areas often remote from repair facilities. To be able to achieve distance with minimum effort and encumbrance, the rider desires to travel with as little equipment as possible. It is essential that any repair material be small, light in weight, and efficient. Despite high quality equipment, a relatively common occurrence is the failure or blow-out of a tire tube resulting in a flat tire and immobility. Immediate patching of the failed tube to correct the fault is often not practical, and instead the rider will generally carry a spare inner tube with which to replace a damaged one.

Tire inner tubes in general use are equipped with one of two types of attached tube inflation valves, either a SCHRADER or PRESTA valve. Both of these valves are vulcanized to the tire tube and function similarly. The body of the SCHRADER valve, however, is of larger diameter than its PRESTA counterpart. In addition, the valve stem in the SCHRADER design is recessed within the valve body whereas the valve stem projects above the valve body in the PRESTA design. These differences must be accommodated when inflating a tire tube equipped with a particular inflation valve. Once replaced on the bicycle wheel, there remains the task of properly inflating the tire tube. Hand air pumps are available for this purpose, but it is desirable to have a quicker, easier and more efficient way of inflating the replaced tire tube.

Applicant's tire inflation system meets the above requirements.

SUMMARY OF THE INVENTION

According to the invention, there is a conduit having an outlet sealably attachable to the tube inflation valve after the tire and tube have been mounted on a bicycle wheel. A cartridge filled with a requisite pressurized volume of gas, sealed in the cartridge by a puncturable seal, is threadably attached to the inlet of the conduit. A puncture assembly contained within the inlet, and forming a portion of the gas passage between the inlet and outlet of the conduit ruptures the cartridge seal when the cartridge is firmly attached in the sleeve. Rupturing the cartridge seal allows the pressurized gas to pass through the conduit, force open the tube inflation valve, and inflate the tire tube to the desired pressure. By use of a selectively adaptable resilient coupling member, the conduit may be force fit to either a SCHRADER or PRESTA type tube inflation valve.

The puncture assembly further has a sealing ring that encircles the puncture device for rupturing the cartridge seal. So when the cartridge seal is ruptured, the sealing ring contacts the cartridge seal around the rupture, sealing off the opening and stopping the gas flow. The sealing ring thus controls flow from the cartridge seal to the outlet to the inflation valve. By rotating the threaded end of the cartridge in the threads of the inlet, the sealing ring is moved into and out of contact with the cartridge seal, thus shutting off the gas flow to the outlet passage, or controlling the gas flow.

The primary object of the invention is to provide a new and improved tire inflation apparatus. The system is light in weight, of compact design, and highly portable. It is rugged and simple to use. The nonlinear flow passage allows easy access and attachment to the tube inflation valve, and is especially suited for use with increasingly popular disc wheels. The conduit minimizes cold transfer accompanying flow of the expanding pressurized gas relative to prior designs. The flat sides of the conduit facilitate a firm, positive grip during operation. The system inflates a tire to the desired pressure quickly and without gauging. It is usable with generally available tube inflation valves. The apparatus is safe in operation and reusable.

In the sealed passage embodiment, the gas flow from the cylinder may be stopped entirely, or it may be controlled in a manner to gradually inflate the tube.

These together with other objects and advantages will become more apparent in considering the details of construction and operation of the tire inflation apparatus as they are more fully described. Reference will be made to the accompanying drawings wherein like numerals refer to like parts throughout and in which:

FIG. 1 is a perspective view of a conduit and cap;

FIG. 2 is a sectional view taken on line 2—2 of FIG. 1;

FIG. 3 is a perspective view of the insert and puncture elements;

FIG. 4 is a side elevation view showing the system in use to inflate a bicycle tire;

DETAILED DESCRIPTION OF THE PREFERRED EMBODIMENT

Figure 5:
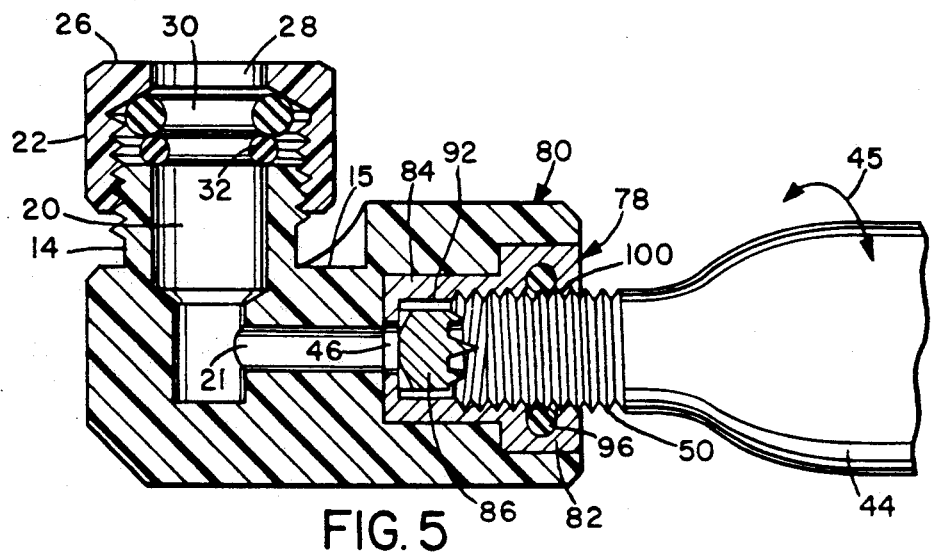
FIG. 5 is a view similar to FIG. 2, illustrating an alternative puncture arrangement.
Figure 6:
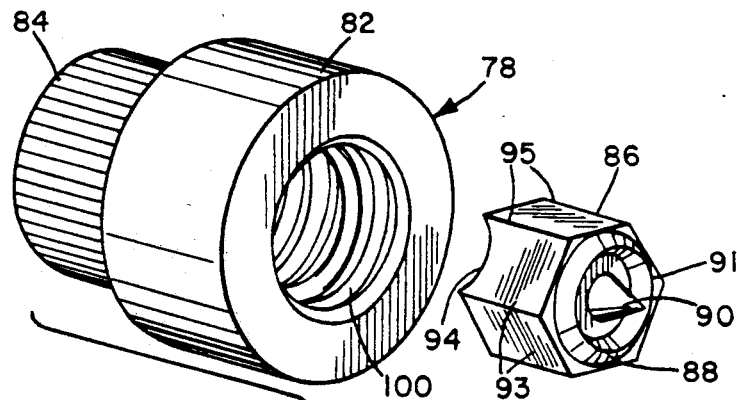
FIG. 6 is a perspective view of the alternative insert and puncture elements.

In FIG. 1, the external features of the device are illustrated wherein the structure comprises a main body 12 and an outlet extension 14. Outlet extension 14 and main body 12 are illustrated in an L-shaped relationship, however, other configurations may be utilized.

Main body 12 is typically cylindrical in construction with flat sides 11 and beveled edges 13 at the ends thereof. Main body 12 is provided with an inlet port 16 fitted with an open ended cylindrical sleeve 18 equipped with internal threads 19.

Outlet extension 14 is typically located at an end opposite an end in which the opening protrudes outwardly from side 15 of main body 12. Outlet tube 20 extends inwardly into main body internal bore 21. Outlet extension 14 is provided with external threads for threadable connection to cap 22. Cap 22 has an orifice 28 through its upper end 26. As illustrated in FIGS. 2 and 4, the system is utilized by coupling outlet extension 14 to a tire tube inflation valve 24, which coupling is achieved by resiliently sealing tire tube inflation valve 24 in contact with at least one "O"-ring removably seated in cap 22. Upper "O"-ring 30 is preferably of larger inside diameter than its adjacent counterpart, lower "O"-ring 32. Accordingly, upper "O"-ring 30 alone is used for SCHRADER valves while both upper and lower "O"-rings 30 and 32 are used with PRESTA valves.

As illustrated in FIGS. 2 and 3, sleeve 18 is provided with a puncture element comprising a cylindrical plug 35. Plug 35 has an internal bore 36 opening to a puncture nozzle 38 projecting from one end, nozzle 38 having a pointed end 40 for piercing the seal of an inflation cartridge 44.

Plug 35 has a gas-tight press fit in a socket 34 within sleeve 18. Sleeve 18 is press fit in main body 12 at inlet port 16. Sleeve 18 has an aperture 46 which connects plug bore 36 to internal bore 21 of body 12.

Referring to FIGS. 2 and 4, cartridge 44 is illustrated as a bottle-shaped element provided with external cartridge threads 50. Cartridge threads 50 mate with internal threads 19 of sleeve 18 when attaching the cartridge to the sleeve. Cartridge 44 is closed by a metal seal (not shown) to retain pressurized gas therein. Pointed end 40 of nozzle 38 punctures the seal of cartridge 44 as it is fully threaded into sleeve 18, thus allowing the flow of compressed gas through nozzle 28. When cartridge 44 is fully seated in sleeve 18 cartridge 44 compresses inlet "O"-ring 52 against puncture element 35 to effect a seal around cartridge 44. This sealing action prevents the loss of inflation gas via the threaded connection of sleeve 18 and cartridge 44.

Operation of the tire inflation system is described with references to FIGS. 2 and 4. Operation is achieved in the same manner with either SCHRADER or PRESTA type tube inflation valves. Outlet extension 14, with "O"-ring- bearing cap 22 in place, is forced over the inflation valve to achieve a firm gas-tight attachment therebetween. Cartridge 44 is then firmly threaded into sleeve 18. Cartridge 44 is turned in a clockwise direction until gas is heard flowing from the cartridge, and tightly enough to effect a seal created when the end of the threaded cartridge collar compresses "O"-ring 52 to prevent gas from escaping due to back pressure. The pressure of compressed gas from cartridge 44 forces open inflation valve 24 allowing gas to flow into the tire tube. When the tire has been sufficiently filled, or when gas is no longer flowing from the cartridge, the outlet extension is removed from inflation valve 24.

Referring now to FIG. 5, the inlet port 80 of the tire inflation system has a cylindrical sleeve 78 with a larger cylindrical end 82 and a smaller cylindrical port 86. This modified inlet sleeve 78 is press fitted into the cylindrical recess, and held against turning by the bevels on end 86.

The inlet port 80 has internal threads 100 which receive the threaded end 50 of the gas cartridge 44. An "O"-ring 96 fits into a recess in the internal threads 100, to provide a seal between the outer sleeve 78 and the threaded end 50 of the gas cartridge 44. Positioned in the inner passage 92 of the inlet port sleeve 78, is a modified puncturing device 86 which comprises a plug having flattened or beveled outer surfaces 93. The plug 86 abuts against the shoulder 98 in the sleeve 78, and is generally held against rotation by contact between the outer edges 95 of the plug 86 and the inner surface 92 of the flow passage.

Figure 8:
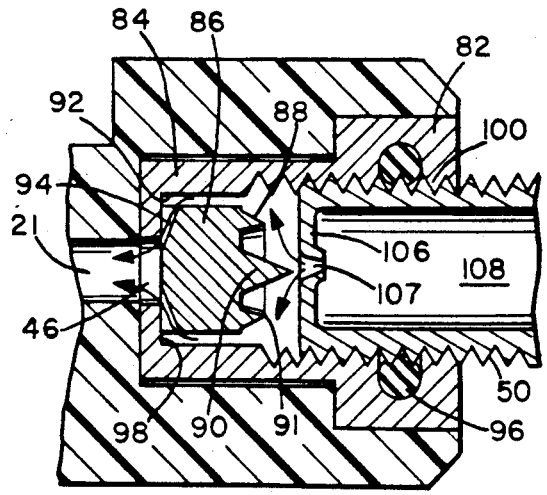
FIG. 8 is a similar view with the capsule unscrewed slightly to release the compressed gas.

On the face of the puncturing device is a projecting puncturing element 90 having a generally conical shape with a sharp pointed end. When the puncturing device is in position, element 90 punches the seal 106 of the end 50 of the cartridge 44, providing a ruptured opening 107 (see FIG. 8), through which the gas passes from the cartridge 44 through throat 108, through opening 107, and in the direction of the arrows, then passes through the flow passage 92 and down over the beveled end 94 and through opening 46 to the outlet flow passage 21. The flat surfaces 93 on appropriate sides of the plug 86 are beveled at 94 to provide flow passage through the opening 46.

Figure 7:
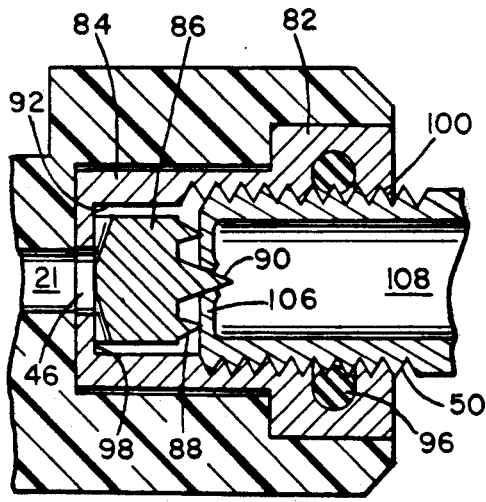
FIG. 7 is an enlargement of a portion of FIG. 5, showing the capsule punctured but sealed.

A sealing ring 88 is positioned on the face of the puncturing device 86, which sealing ring has a pointed or knife-like, circular edge surface 91 that directly contacts the outer, non-ruptured seal 106 of the cartridge 44, thus sealing the flow of gas from the opening 107 to the flow passage 92. However, when the cartridge 44 is rotated either in the clockwise or counterclockwise direction of arrows 45, the seal 106 of the cartridge 44 is moved toward or away from contact with the sealing ring 88. It may thus be understood, that upon rotation of the cartridge 44, the flow of gas through opening 107 may be shut off as in the illustration of FIG. 7, or allowed to flow as in the illustration of FIG. 8. It may be further understood that by positioning the spacing between seal 106 and sealing ring 88, the flow of the gas will be selectively controlled, providing a more controlled and desirable inflation of the tube. Further, by making the sealing connection as is illustrated in FIG. 7, the inflation device may be removed from the tube inflation valve with the gas in gas cartridge 44 sealed, and the entire system will remain in a static condition for future use of the remaining gas in cartridge 44 to inflate another tube on another occasion. This is accomplished by making the aforesaid described connection of outlet end 26 with the tube inflation valve, and then rotating bottle 44, for example in a counterclockwise direction, separating seal 106 and sealing ring 88, and allowing the gas to flow again from the cartridge 44 to the tube.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment shown herein, but is to be accorded the widest scope consistent with the principles and novel features disclosed herein.

Having described my invention, I now claim:

1. A tire inflation system for inflating a tire inner tube through a tire inflation valve comprising:

a cartridge having an end with a seal and containing a volume of pressed gas;

a conduit having an inlet port for connection to the cartridge and an outlet port for connection to a tire inflation valve and a flow passage interconnecting said ports;

said inlet port and the end of the cartridge having connection means for connection to one another and for allowing movement of the end of the cartridge in said inlet port;

puncture means contained within the inlet port having a projection for contacting and puncturing the cartridge seal to permit the gas to enter the flow passage;

said puncture means having an outer sealing ring for contacting said sealed opening around the point of puncturing for controlling the flow of gas from said cartridge through the space between said sealing ring and said sealed opening to said flow passage; and said puncture means having at least one outer channel for conducting the flow from said inlet port to said flow passage.

2. A tire inflation system as claimed in claim 1, wherein:
   said connection means comprises internal threads in said inlet port and external threads at the end of said cartridge,
   and said internal threads of said inlet port having an O-ring positioned therein for sealing the space between the threaded end of the cartridge and internal threads.

3. A tire inflation system as recited in claim 1, wherein:
   said connection on means permits the seal to be moved relative to said sealing ring by rotation of the cartridge, thereby selectively controlling the flow of gas.

4. A tire inflation system as recited in claim 1, wherein:
   said inlet flow passage having a shoulder, and said puncture means comprising a cylindrical plug having one side beveled to form the said at least one outer channel.

5. A tire inflation system as recited in claim 1, wherein:
   said flow passage has an inner cylindrical surface and
   said puncture means comprising a cylindrical plug having a plurality of non-circular outer surfaces for providing a plurality of the said at least one outer channel for passage of gas from said cartridge between said plug and the inner cylindrical surface of the flow passage.

6. A tire inflation system as recited in claim 1, wherein:
   said inlet port comprising a cylindrical flow passage having an internal cylindrical shoulder;
   said puncture means comprising a cylindrical puncture device that abuts against said shoulder; and
   said puncture device having a portion of the outer cylindrical surface beveled to form the said at least on outer channel to thereby expose the opening inside of said shoulder for the passage of gas therethrough.

7. A tire inflation system for inflating a tire inner tube, through a tire inflation valve comprising:
   a cartridge having a threaded end with a sealed opening and containing a volume of compressed gas;
   a conduit having an inlet port for connection to the cartridge and an outlet port for connection to a tire inflation valve;
   said inlet port having internal threads for receiving the threaded end of the cartridge having the sealed opening;
   puncture means contained within the inlet port having a projection for puncturing the cartridge seal to permit the gas to enter the flow passage;
   said puncture means having an outer sealing ring for contacting said sealed opening, around the point of puncturing, for controlling the flow of gas from said cartridge to said flow passage;
   said puncture means having an outer channel for conducting the flow from said inlet port to said flow passage.

8. A tire inflation system as recited in claim 7, wherein:
   the sealed opening of said cartridge being movable into and out of contact with said cartridge, by rotating said cartridge in the threaded portion of said inlet port.

* * * * *

UNITED STATES PATENT AND TRADEMARK OFFICE
CERTIFICATE OF CORRECTION

PATENT NO. : 5,012,954
DATED : May 17, 1991
INVENTOR(S) : Conrad A. Will

It is certified that error appears in the above-identified patent and that said Letters Patent is hereby corrected as shown below:

Column 5, Line 16, "on" should be deleted.

Signed and Sealed this

Thirteenth Day of April, 1993

Attest:

STEPHEN G. KUNIN

*Attesting Officer*     *Acting Commissioner of Patents and Trademarks*